United States Patent [19]
Onzuka et al.

[11] Patent Number: 5,844,051
[45] Date of Patent: Dec. 1, 1998

[54] COATING COMPOSITION FOR HIGH-MOLECULAR WEIGHT ELASTIC BODY

[75] Inventors: Tetsuo Onzuka, Yotsukaido; Yoshihiro Itoh, Chiba, both of Japan

[73] Assignee: Kinugawa Rubber Ind. Co., Ltd., Chiba, Japan

[21] Appl. No.: 637,388

[22] Filed: Apr. 25, 1996

[51] Int. Cl.$^6$ .................. C09D 175/04; C09D 183/08; C08L 75/04; C08L 83/08
[52] U.S. Cl. .................. 525/452; 427/387; 427/389.7; 427/393.5; 523/168; 524/261; 524/267; 524/268; 524/589; 524/590; 524/731; 525/453; 525/460; 525/474
[58] Field of Search ................... 524/261, 267, 524/268, 589, 590, 731; 525/452, 453, 460, 474; 427/387, 389.7, 393.5; 523/168

[56] References Cited

U.S. PATENT DOCUMENTS

| | | | |
|---|---|---|---|
| 3,843,577 | 10/1974 | Keil | 523/425 |
| 4,265,801 | 5/1981 | Moody et al. | 525/453 |
| 4,857,593 | 8/1989 | Leung et al. | 525/92 |
| 5,356,585 | 10/1994 | Romenesko | 264/211 |
| 5,488,092 | 1/1996 | Kausch et al. | 528/60 |
| 5,674,567 | 10/1997 | Kausch et al. | 427/385.5 |
| 5,700,868 | 12/1997 | Hanada | 524/590 |
| 5,708,084 | 1/1998 | Hauenstein et al. | 525/102 |
| 5,736,251 | 4/1998 | Pinchuk | 428/447 |

FOREIGN PATENT DOCUMENTS

| | | |
|---|---|---|
| 56-19813 | 5/1981 | Japan . |
| 61-4408 | 2/1986 | Japan . |
| 4-37859 | 6/1992 | Japan . |

*Primary Examiner*—Rabon Sergent
*Attorney, Agent, or Firm*—Foley & Lardner

[57] ABSTRACT

The invention relates to a coating composition intended to be applied to a surface of a high-molecular-weight elastic body. The coating composition includes 100 parts by weight of a mixture of a polyisocyanate and a compound containing therein at least two active hydrogen atoms which are capable of reacting with the polyisocyanate to prepare a polyurethane, and 0.5–100 parts by weight of a diorganopolysiloxane having an average degree of polymerization from 6,000 to 10,000. The coating composition provides a coating film which is superior in durability. Furthermore, this coating film does not generate an uncomfortable noise even when a glass plate wet with water slides on the coating film.

13 Claims, 1 Drawing Sheet

COATING COMPOSITION FOR HIGH-MOLECULAR WEIGHT ELASTIC BODY

BACKGROUND OF THE INVENTION

1. Field of the Invention

The present invention relates to a coating composition which is to be applied to the surface of a high-molecular-weight elastic body such as rubber, for the purpose of improving the sliding characteristics between the elastic body and a glass plate and of improving abrasion resistance of the elastic body and the like.

2. Description of the Prior Art

Hitherto, high-molecular-weight elastic bodies have been used in various fields. For example, when a high-molecular-weight elastic body is interposed between two objects which are to be in contact with each other, these objects are protected by the elastic body. Furthermore, an uncomfortable noise caused by the sliding movement of these objects relative to each other can be reduced by the elastic body. Such elastic body has been used, for example, as a weather strip of automobile or of architecture. In general, it is necessary that weather strip is superior in weathering resistance, heat resistance, water resistance, sliding characteristic, anti-freezing characteristic, and the like. Therefore, there are demands for the improvement of a high-molecular-weight elastic body itself and for the surface treatment techniques for the elastic body.

As one of the surface treatment techniques for a weather strip, Japanese Patent Examined Publication JP-B-Sho-61-4408 discloses a method of treating the surface of a weather strip with a coating composition containing a urethane paint and a silicone oil having a viscosity from 100 to 10,000 centistokes (cSt), for improving durability of the weather strip.

Japanese Patent Examined Publication JP-B-Hei-4-37859 discloses another coating composition for treating the surface of a high-molecular-weight elastic body. This coating composition contains a mixture of a polyisocyanate and a polyol, a curable silicone, a bonding agent, and a silicone oil. This curable silicone can be selected from a first composition disclosed in Japanese Patent Examined Publication JP-B-Sho-56-19813 and other curable polyorganosiloxane compositions. The first composition disclosed therein comprises polyorganosiloxanes each containing a silanol group (-SiOH) at the terminal of the molecule. Therefore, these polyorganosiloxanes are highly reactive.

SUMMARY OF THE INVENTION

It is an object of the present invention to provide an improved coating composition to be applied to the surface of a high-molecular-weight elastic body, which composition is superior in durability, is capable of substantially suppressing the generation of an uncomfortable noise caused by the sliding movement of a glass plate on the elastic body, and is suitable to be applied to the surface of a weather strip.

According to the present invention, there is provided a coating composition intended to be applied to a surface of a high-molecular-weight elastic body, said composition comprising:

100 parts by weight of a mixture of a polyisocyanate and a compound containing therein at least two active hydrogen atoms which are capable of reacting with said polyisocyanate to prepare a polyurethane; and 0.5–100 parts by weight of a diorganopolysiloxane having an average degree of polymerization from 6,000 to 10,000.

In the invention, it is preferable that the diorganopolysiloxane has a straight chain structure and is represented by the following general formula (1):

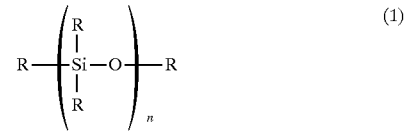

where n is from 6,000 to 10,000, and R is the same or different unreactive organic functional groups, preferably at least one selected from the group consisting of alkyl groups, phenyl group and trifluoropropyl group, still preferably methyl group. With these preferable characteristics of the diorganopolysiloxane, the diorganopolysiloxane becomes well mixed with the mixture of a polyisocyanate and the above-mentioned compound. Therefore, a coating film prepared by the application of the coating composition is well bonded to the surface of the elastic body. With this, the coating film becomes superior in durability.

DETAILED DESCRIPTION OF THE INVENTION

Figure 1:
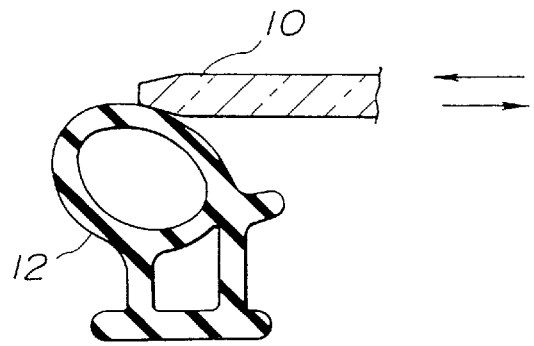
FIG. 1 is a sectional view showing a sliding reciprocal movement of a glass plate relative to a high-molecular-weight elastic body having thereon a coating film, in a first evaluation test for evaluating kinetic friction coefficient and durability of the test samples.

A coating composition which is to be applied to the surface of a high-molecular-weight elastic body will be described in accordance with the present invention in the following.

A diorganopolysiloxane according to the invention has an average degree of polymerization from 6,000 to 10,000. With this, this diorganopolysiloxane is in the form of rubber. It is assumed that the diorganopolysiloxane molecules and the polyurethane molecules prepared by curing the mixture of a polyisocyanate and the abovementioned compound are entangled with each other, so to speak, in the coating film prepared by the application of the coating composition, due to that the diorganopolysiloxane has a high molecular weight, preferably from 400,000 to 800,000. Therefore, as compared with conventional silicones (silicone oils) used as an additive of urethane paint, a diorganopolysiloxane according to the invention does not easily bleed from the coating film, but very gradually bleeds therefrom, even when the coating film is exposed to rain water and the like. This contributes to provide a low kinetic friction coefficient for a long time. Thus, the coating film becomes superior in durability. Furthermore, the diorganopolysiloxane provides the coating film with an adequate softness. With this, an uncomfortable noise caused by the sliding movement of a glass plate relative to the elastic body is substantially suppressed. The diorganopolysiloxane exposed on the surface of the elastic body provides a good sliding movement of a glass plate relative to the elastic body, and is partially transferred from the elastic body to the surface of the glass plate and is allowed to strongly adhere to the surface of the glass plate, due to the molecular weight of the diorganopolysiloxane being high. With this, the glass plate's surface repels water as well as the coating film on the elastic body does. Therefore, an uncomfortable noise caused by the sliding movement of the glass plate relative to the elastic body is further substantially suppressed. The diorganopolysiloxane on the glass plate is not easily removed. Therefore, this also contributes to provide a low kinetic friction coefficient for a long time.

It is preferable that a diorganopolysiloxane according to the invention has a viscosity of at least 5,000,000 centipoises and thus is in the form of rubber having a very low fluidity.

As stated above, a diorganopolysiloxane according to the invention has an average degree of polymerization from 6,000 to 10,000. If it is less than 6,000, the diorganopolysiloxane easily bleeds from the coating film exposed to rain water and the like and easily flows away therewith. Therefore, the kinetic friction coefficient between the glass plate and the elastic body becomes inferior, and the water repelling capability of the coating film becomes small. If it is greater than 10,000, it becomes difficult to dissolve the diorganopolysiloxane in a solvent and thus to disperse the diorganopolysiloxane in a urethane paint.

As stated above, a coating composition according to the invention comprises 100 parts by weight of a mixture of a polyisocyanate and a compound containing therein at least two active hydrogen atoms which are capable of reacting with the polyisocyanate to prepare a polyurethane.

Examples of the above-mentioned compound are polyols, polyamines and polycarboxylic acids. Examples of the polyol are polyetherpolyols prepared by addition polymerization of propylene oxide, ethylene oxide and the like, and polyesterpolyols prepared by polycondensation of an organic acid such as adipic acid and a hydroxy-containing compound such as a short-chain diol. Further examples of the polyol are polytetramethylene ether glycol, lactone polyols, acrylic polyols, polycarbonate polyols, caster oil polyols, and polybutadiene polyols. As the above-mentioned compound, mixtures of at least two of these examples, compounds prepared by addition polymerization of polyether and an ester of polyether, copolymers of silicones and polyethers, and copolymers prepared by copolymerization of polyols with silicone compounds may be cited.

A polyisocyanate according to the invention is not limited to a particular compound, as long as it contains in the molecule a plurality of isocyanate groups (-NCO). Examples of the polyisocyanate are tolylene diisocyanate (TDI), diphenylmethane diisocyanate (MDI), hexamethylene diisocyanate (HDI), xylylene diisocyanate (XDI), naphthalene diisocyanate (NDI), isophorone diisocyanate (IPDI), lysine isocyanate (LDI) (i.e., 2,6-diisocyanate methylcaproate), hydrogenated diphenylmethane diisocyanate ($H_6$MDI), hydrogenated xylylene diisocyanate ($H_{12}$XDI), modification products such as TMP adducts, water adducts and trimers, prepolymers prepared by polyols and polyisocyanates, mixtures of at least two of these examples, and blocked isocyanates such as blocked phenol compounds and blocked oxime compounds.

A straight-chain diorganopolysiloxane according to the invention is obtained, for example, by ring-opening-polymerization of a cyclic siloxane, or by hydrolysis and polymerization of an organochlorosilane or of an organoalkoxysilane. The diorganopolysiloxane may be a first diorganopolysiloxane in which methyl group(s) at the side chain and/or the terminal has been partially replaced by phenyl group and/or a group containing ether linkage. Furthermore, the diorganopolysiloxane may be a second diorganopolysiloxane which has been modified by at least one selected from the group consisting of polyethers, methylstyrene, higher fatty acid esters, higher alcohols, higher fatty acids, and fluorine.

Depending on the condition of the use of the coating composition and the like, the coating composition may be mixed, in a suitable manner, with a curable silicone oil, a modified silicone oil, a common silicone oil, a bonding agent, a pigment, a flatting agent, a catalyst, a solvent and the like. Curable silicone oil is a silicone oil which has an OH-group at the terminal of the molecule or a plurality of hydrogen atoms in the molecule. Curable silicone oil has a characteristic that it reacts with a metal catalyst thereby to cure and thus to form a silicone resin film.

In the invention, the amount of the diorganopolysiloxane is 0.5–100 parts by weight, preferably 2–80 parts by weight, per 100 parts by weight of the mixture of a polyisocyanate and the compound. If it is less than 0.5 parts by weight, an advantageous effect of the addition of the diorganopolysiloxane becomes insufficient. If it is greater than 100 parts by weight, the coating film becomes weak in strength.

The present invention will be illustrated with the following nonlimitative examples.

EXAMPLE 1

In this example, a coating composition was prepared by mixing together 85 parts by weight of a polyol (OLESTER NL2448 (trade name) of Mitsui Toatsu Co), 15 parts by weight of a polyisocyanate (CORONATE HX (trade name) of Nippon Polyurethane Industry Co.), 2 parts by weight of a diorganopolysiloxane (RY16-140 (trade name) of Toray-Dow Corning Co.) which has an average degree of polymerization from 6,000 to 10,000 and is in the form of rubber, 40 parts by weight of a curable silicone oil (YSR 3022 (trade name) of Toshiba Silicone Co.), 4 parts by weight of a catalyst (NEOSTAN (trade name) of Nitto Kasei Co.), 6 parts by weight of a common silicone oil (KF96H (trade name) of Shin-Etsu Chemical Co.), 12 parts by weight of a halogenated ethylene-propylene terpolymer (EPT) (PERGOOT S20 (trade name) of Byer Co.), 15 parts by weight of a flatting agent (KGL-805 (trade name) of Sakai Chemical Co.), 5 parts by weight of a pigment (CARBON BLACK #30 (trade name) of Mitsubishi Kasei Co.), and 1,500 parts by weight of a solvent which is a mixture of toluene and methyl ethyl ketone.

Then, the thus prepared coating composition was applied to the surface of a weather strip, using a spray gun having an opening diameter of 1 mm. The thus formed coating film was dried at 100°C. for 10 min.

Figure 2:
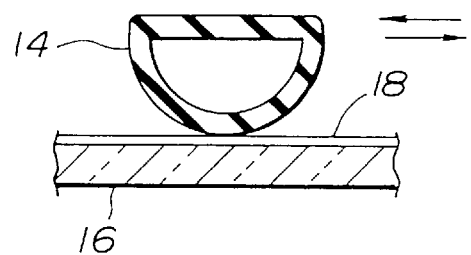
FIG. 2 is a sectional view showing a sliding reciprocal movement of a high-molecular-weight elastic body having thereon a coating film, relative to a glass plate having thereon a water film, in a second evaluation test with respect to sliding noise of the test samples.
Figure 3:
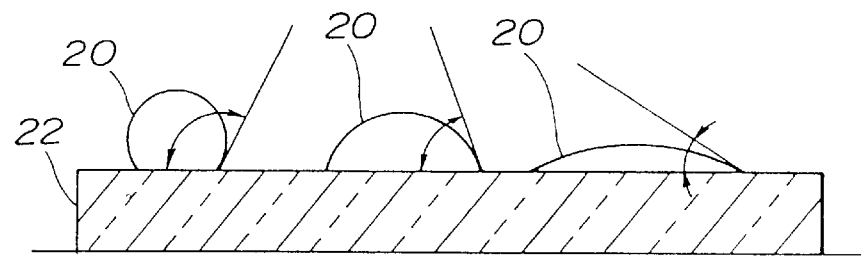
FIG. 3 is a side view showing different shapes of water drops on a glass plate which has been slid on the elastic body, in a third evaluation test with respect to water repellency of the test samples.

The evaluation tests were conducted on the coated weather strip as follows. The results are shown in Table. In a first evaluation test, as shown in FIG. 1, a glass plate 10 was slid on a weather strip 12, with a stroke of 100 mm at a rate of 60 reciprocations per 1 min, while the pressure between the glass plate's surface and the weather strip's surface was maintained at 10 g/mm². This sliding movement of the glass plate 10 was continued until the rubber surface of the weather strip was exposed. During the first evaluation test, kinetic friction coefficient between the glass plate 10 and the coated weather strip 12 was measured. The total number of reciprocations of the glass plate 10 in the first evaluation test was recorded as the result with respect to durability. In a second evaluation test, as shown in FIG. 2, a weather strip 14 was slid on a glass plate 16, with a stroke of 100 mm at a rate of 60 reciprocations per 1 min, while the pressure between the glass plate's surface and the weather strip's surface was maintained at 10 g/mm$^2$, and while a water film 18 was formed on the glass plate 16 by dropping water drops to the glass plate 16. During the second evaluation test, a noise caused by the sliding movement of the weather strip 14 was checked by a person's hearing, and the result was classified into one of four grades (A, B, C, and D). A, B, C and D were arranged in ascending order of noise level. "A" means that the noise was not audible at a distance of 30 mm from the weather strip's surface sliding on the glass surface. "B" means that the noise was audible as a faint sound at a distance of 30 mm from this weather strip's surface. "C" means that the noise was audible as a faint sound at a distance of 300 mm from this weather strip's surface. "D" means that the noise was audible as a loud sound at a distance of 300 mm from this weather strip's surface. In a third evaluation test, the coated weather strip was slid on a glass plate 22 by ten reciprocations in the same manner as in the second evaluation test. After this test, the contact angle of a water drop on the coating film of the weather strip, and the contact angle of a water drop 20 on the glass plate 22, as shown in FIG. 3, were respectively measured.

EXAMPLE 2

In this example, Example 1 was repeated except in that the amount of the diorganopolysiloxane was 40 parts by weight.

EXAMPLE 3

In this example, Example 1 was repeated except in that the amount of the diorganopolysiloxane was 80 parts by weight.

COMPARATIVE EXAMPLE 1

In this comparative example, Example 1 was repeated except in that the diorganopolysiloxane, the curable silicone oil, the catalyst, and the halogenated EPT were omitted and that the amount of the second silicone oil was 4 parts by weight.

COMPARATIVE EXAMPLE 2

In this comparative example, Example 1 was repeated except in that the diorganopolysiloxane was omitted.

TABLE

|  | Com. Ex. 1 | Com. Ex. 2 | Ex. 1 | Ex. 2 | Ex. 3 |
|---|---|---|---|---|---|
| Kinetic Friction Coef. | 0.10 | 0.45 | 0.30 | 0.20 | 0.15 |
| Durability (No. of Reciprocations) | 10,000 | 4,000 | 40,000 | 40,000 | 30,000 |
| Sliding Noise | D | C | B | A | A |
| Contact Angle on Coating Film (°) | 108 | 110 | 111 | 112 | 114 |
| Contact Angle on Class Plate (°) | 20 | 22 | 40 | 60 | 64 |

As shown in Table, in Comparative Example 1 in which the diorganopolysiloxane and the curable silicone oil were omitted, although the kinetic friction coefficient was as small as 0.1, durability was inferior, and the sliding noise was evaluated as "D". In Comparative Example 2 in which the diorganopolysiloxane was omitted, durability was inferior, the sliding noise was evaluated as "D", and the kinetic friction coefficient was as large as 0.45. In Example 1, the kinetic friction coefficient was as small as 0.3, durability was satisfactory, and the sliding noise was evaluated as "B". In each of Examples 2–3, the kinetic friction coefficient was sufficiently low, durability was satisfactory, and the sliding noise was evaluated as "A". Due to a low kinetic friction coefficient between a glass plate and the elastic body, abrasion of the coating film is reduced. With this, durability of the coating film and the elastic body is improved.

Furthermore, as shown in Table, in each of Comparative Examples 1–2, the contact angle of a water drop on the glass plate which had been slid on the elastic body was as small as about 20 degrees. In other words, it is considered that the glass plate was not provided with water repellency by the sliding movement of the glass plate. In contrast, in Examples 1–3, the contact angle of a water drop on the glass plate which had been slid on the elastic body was as large as 40–64 degrees. With this, it is considered that the glass plate was provided with water repellency by the sliding movement of the glass plate. Thus, it is assumed that the provided water repellency was caused by a diorganopolysiloxane film prepared by the partial transfer of the diorganopolysiloxane from the elastic body's surface to the glass plate's surface and then by the bonding of the thus transferred diorganopolysiloxane to the glass plate's surface. Thus, coating compositions according to Examples 1–3 can be efficiently used for the application to a weather strip. According to Examples 1–3, the glass plate was provided with water repellency. With this, kinetic friction coefficient between a glass plate and the elastic body is further reduced, together with the provision of the coating film on the elastic body. Since the diorganopolysiloxane has an average degree of polymerization from 6,000 to 10,000 and thus has a high molecular weight, the above-mentioned diorganopolysiloxane bonded to the glass plate's surface is not easily removed. Therefore, it is possible to maintain the kinetic friction coefficient at a low value for a long time.

What is claimed is:

1. A coating composition intended to be applied to a surface of a high-molecular-weight-weight elastic body, said composition comprising:
   100 parts by weight of a mixture of a polyisocyanate and a compound containing therein at least two active hydrogen atoms which are capable of reacting with said polyisocyanate to prepare a polyurethane; and
   0.5–100 parts by weight of a diorganopolysiloxane having an average degree of polymerization from 6,000 to 10,000 and a viscosity of at least 5,000,000 centipoises.

2. A coating composition according to claim 1, wherein said diorganopolysiloxane has a straight chain structure and is represented by the following general formula:

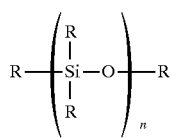

wherein n is from 6,000 to 10,000, and R is the same or different unreactive organic groups.

3. A coating composition according to claim 2, wherein said R is at least one group selected from the group consisting of alkyl groups, phenyl group, and trifluoropropyl group.

4. A coating composition according to claim 3, wherein side R is methyl group.

5. A coating composition according to claim 2, wherein said R is a methyl group that has been partially replaced by a phenyl group and/or a group containing ether linkage.

6. A coating composition according to claim 1, wherein said diorganopolysiloxane has been modified by at least one substance selected from the group consisting of polyethers, methylstyrene, fatty acid esters, alcohols, fatty acids, and fluorine.

7. A coating composition according to claim 1, wherein said compound is at least one selected from the group consisting of polyols, polyamines and polycarboxylic acids.

8. A coating composition according to claim 7, wherein said compound is a polyol.

9. A coating composition according to claim 7, wherein said compound is a copolymer prepared by copolymerization of a polyol with a silicone compound.

10. A coating composition according to claim 1, wherein said diorganopolysiloxane is in amount from 2 to 80 parts by weight.

11. A method of using the coating composition of claim 1, which comprises coating the composition onto the elastic body to form a film of the coating composition on the elastic body.

12. A method as claimed in claim 11, that further comprises bringing a glass plate into contact with the coated elastic body.

13. A method as claimed in claim 12, wherein the diorganopolysiloxane is partially transferred from the elastic body to the surface of the glass plate and adheres to the surface of the glass plate.

* * * * *